United States Patent
Tunstall

(10) Patent No.: US 11,522,669 B2
(45) Date of Patent: Dec. 6, 2022

(54) USING CRYPTOGRAPHIC BLINDING FOR EFFICIENT USE OF MONTGOMERY MULTIPLICATION

(71) Applicant: CRYPTOGRAPHY RESEARCH, INC., San Jose, CA (US)

(72) Inventor: Michael Tunstall, Walnut Creek, CA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 0 days.

(21) Appl. No.: 17/042,006

(22) PCT Filed: Mar. 26, 2019

(86) PCT No.: PCT/US2019/023997
§ 371 (c)(1),
(2) Date: Sep. 25, 2020

(87) PCT Pub. No.: WO2019/191040
PCT Pub. Date: Oct. 3, 2019

(65) Prior Publication Data
US 2021/0083840 A1    Mar. 18, 2021

Related U.S. Application Data

(60) Provisional application No. 62/649,478, filed on Mar. 28, 2018.

(51) Int. Cl.
*H04L 9/00* (2022.01)
*H04L 9/08* (2006.01)
(Continued)

(52) U.S. Cl.
CPC ............ *H04L 9/003* (2013.01); *H04L 9/0825* (2013.01); *H04L 9/302* (2013.01); *H04L 9/3249* (2013.01); *H04L 2209/046* (2013.01)

(58) Field of Classification Search
CPC ....... H04L 9/003; H04L 9/0825; H04L 9/302; H04L 9/3249; H04L 2209/046
See application file for complete search history.

(56) References Cited

U.S. PATENT DOCUMENTS 5,751,620 A * 5/1998 Monier .................. G06F 7/728
380/28
5,982,900 A * 11/1999 Ebihara .................. G06F 7/728
380/30

(Continued)

FOREIGN PATENT DOCUMENTS

EP  1708081 A1  10/2006
EP  3276880 A1   1/2018

(Continued)

OTHER PUBLICATIONS

Notification of Transmittal of the International Search Report and the Written Opinion of the International Searching Authority dated Jun. 18, 2019 re: Int'l Appln. No. PCT/US2019/023997. 134 pages.

(Continued)

*Primary Examiner* — Saleh Najjar
*Assistant Examiner* — Devin E Almeida
(74) *Attorney, Agent, or Firm* — Lowenstein Sandler LLP

(57) ABSTRACT

Aspects of the present disclosure involves receiving an input message, generating a first random value that is used to blind the input message input message to prevent a side-channel analysis (SCA) attack, computing a second random value using the first random value and a factor used to compute the Montgomery form of a blinded input message without performing an explicit Montgomery conversion of the input message, and computing a signature using Montgomery multiplication, of the first random value and the second random value, wherein the signature is resistant to the SCA attack.

18 Claims, 5 Drawing Sheets

(51) Int. Cl.
*H04L 9/30* (2006.01)
*H04L 9/32* (2006.01)

(56) References Cited

U.S. PATENT DOCUMENTS

| | | | |
|---|---|---|---|
| 7,027,597 B1* | 4/2006 | Stojancic | H04L 9/3249 708/502 |
| 7,603,558 B2 | 10/2009 | Shimizu | |
| 9,520,995 B2 | 12/2016 | Pulkus | |
| 2006/0140399 A1* | 6/2006 | Young | H04L 9/3249 380/30 |
| 2006/0285682 A1* | 12/2006 | Sarangarajan | G09C 1/00 380/28 |
| 2010/0014656 A1 | 1/2010 | Ciet et al. | |
| 2010/0177887 A1* | 7/2010 | Ciet | H04L 9/302 380/28 |
| 2011/0216900 A1 | 9/2011 | Yoon et al. | |
| 2013/0114806 A1* | 5/2013 | Bertoni | G06F 7/728 380/28 |
| 2016/0277179 A1 | 9/2016 | Tunstall | |
| 2019/0036678 A1* | 1/2019 | Ahmed | H04L 9/302 |
| 2019/0089523 A1* | 3/2019 | Adjedj | H04L 9/302 |
| 2020/0344056 A1* | 10/2020 | Guilley | H04L 9/302 |

FOREIGN PATENT DOCUMENTS

| | | |
|---|---|---|
| GB | 2403308 B | 6/2006 |
| WO | WO-2005-048008 A2 | 5/2005 |

OTHER PUBLICATIONS

EP Extended European Search Report dated Dec. 14, 2021 re: EP Appln. No. 19778093.5. 11 pages.

EP Response as Filed on Jul. 20, 2022 in Response to the Extended European Search Report dated Dec. 14, 2021 and the Official Communication Pursuant to Rules 70(2) and 70a(2) EPC dated Jan. 12, 2022 re: EP Appln. No. 19778093.5. 26 pages.

* cited by examiner

Implement the equation $S = (r^e m)^{d-1}(r^{e-1} m) \bmod n$, where
r is a random value used to blind the calculation;
e is the public exponent,
m is the input message,
d is the private exponent,
n is the public modulus, and
S is the resulting signature.

1. Generate a random value h, where $h = r R^2 \bmod n$ and $R = 2^{bx} \bmod n$ given n is formed from x words of bit length b.

2. Multiply h by 1 using Montgomery multiplication to generate v, where v= r R mod n.

3. Use v to compute $k = r^{e-1} R \bmod n$. That is, raise v to the power e-1 using Montgomery multiplication.

4. Montgomery multiply k by m to give $j = r^{e-1} m \bmod n$.

5. Montgomery multiply j by k to give $p = r^e m R \bmod n$.

6. Compute $S = p^{d-1} j \bmod n$ using Montgomery multiplication.

FIG. 4

USING CRYPTOGRAPHIC BLINDING FOR EFFICIENT USE OF MONTGOMERY MULTIPLICATION

RELATED APPLICATION

This application claims priory from the U.S. Provisional Application No. 62/649,478, filed Mar. 28, 2018, which is incorporated by reference in its entirety.

BRIEF DESCRIPTION OF THE DRAWINGS

The present disclosure will be understood more fully from the detailed description given below and from the accompanying drawings of various implementations of the disclosure.

FIG. 4 shows details of a signature generation operation, in accordance with some embodiments of the present disclosure.

DETAILED DESCRIPTION

Figure 1:
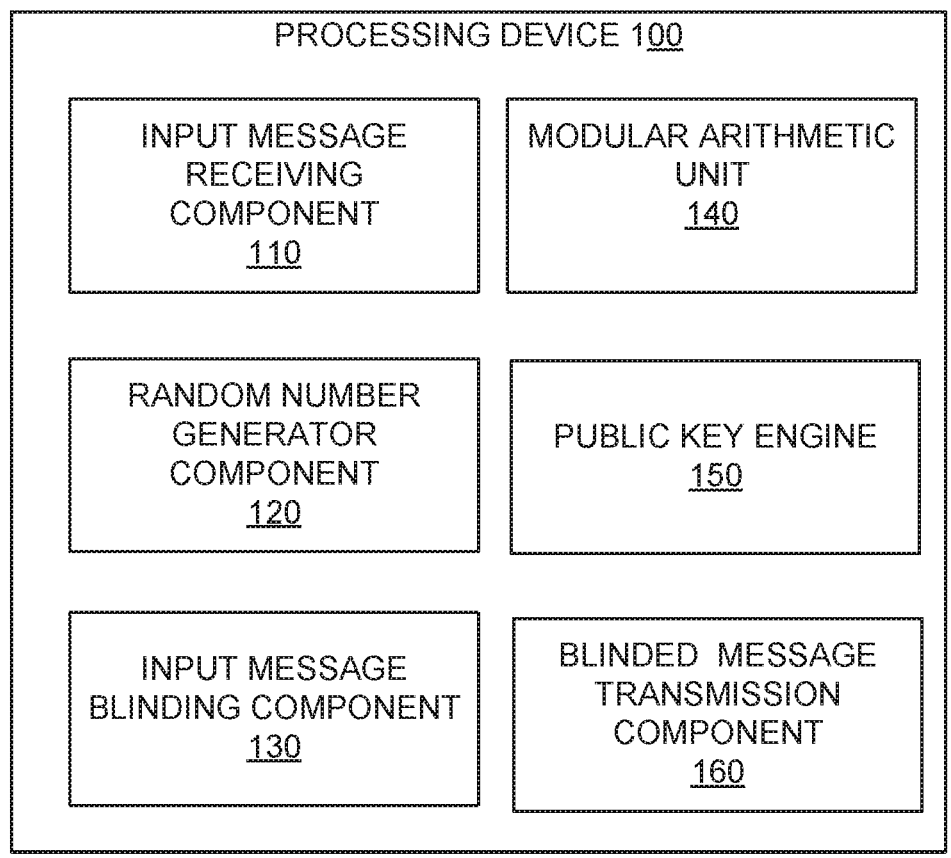
FIG. 1 is a block diagram of the components of a processing device, in accordance with some embodiments.

Aspects of the present disclosure are directed to using side-channel analysis (SCA) countermeasures in modular arithmetic computation used in cryptographic algorithms.

An integrated circuit that performs a cryptographic operation may be susceptible to SCA attack where an unauthorized entity may obtain secret information (e.g., cryptographic keys) as the cryptographic operation is performed. An example of a side-channel attack includes, but is not limited to, Differential Power Analysis (DPA) where the attacker who seeks to obtain a secret key used in the cryptographic operation may study the differences in power profile (i.e., power consumption patterns) of the integrated circuit as the cryptographic operation is performed. An attacker, i.e., an unauthorized entity, may obtain the input (e.g., the secret key) to the cryptographic operation by analyzing power profile measurements of the integrated circuit over a period of time. Accordingly, when the sender transmits a ciphertext to a receiver by encrypting plaintext via a cryptographic operation, the attacker may be able to retrieve the secret key that is used to encrypt the plaintext to the ciphertext by observing the power profile of the integrated circuit as the cryptographic operation is performed to encrypt the plaintext into the ciphertext.

In public-key cryptography systems, a processing device may have various components/modules used for cryptographic operations on an input message 'm'. Examples of such cryptographic operations include, but are not limited to, generating a digital signature 'S' to authenticate a message transmitted by a first node of the public-key cryptography system. A 'node' may encompass a certain hardware component within a computing device, such as a central processing unit (CPU), an integrated circuit (IC), an embedded circuit etc. or the like, that is able to send, receive, and/or forward information within a computer network. A digital signature can be generated using a modular exponentiation technique. For example, when a Rivest-Shamir-Adelman (RSA) algorithm is used as the basis of public-key cryptography (i.e., an input message 'm' is encrypted with both a public key component and a private-key component), the signature 'S' is computed in the form of the equation, $S=m^d$ mod n, where 'n' is a public modulus, and 'd' is a private exponent. A frequently used modular exponentiation technique, which involves fast modular multiplication, is referred to as Montgomery multiplication. Montgomery multiplication requires conversion of an input message into a form suitable for Montgomery multiplication, known as the Montgomery form. To generate a signature using Montgomery multiplication, input message 'm' should be converted into Montgomery form. In general, to multiply two values 'a' and 'b' via Montgomery multiplication, 'a' and 'b' are first converted to Montgomery form, i.e. 'a' is converted to aR mod n and 'b' is converted to bR mod n, in order to produce a double-width product $abR^2$ mod n, which is then subjected to Montgomery reduction to produce abR mod n, which is the desired result of the Montgomery multiplication. That conversion (sometimes also referred to as a transformation), which is a pre-requisite of Montgomery multiplication, and the subsequent reduction that is also part of the Montgomery multiplication, require additional computational resources to be devoted in an integrated circuit. For example, additional on-chip storage may be required to store converted values during Montgomery multiplication.

Aspects of the present disclosure address the above problem by avoiding explicit conversion of the input message into Montgomery form. Instead, a first random value 'r' that is used to blind (i.e. mask) the input message 'm' is used to generate an RSA signature.

The RSA signature takes the following form: $S=(r^e m)^{d-1}(r^{e-1}m)$ mod n, wherein e' is a public exponent, and 'd' is a private exponent. The random value 'r' has a bit length equal to or less than the public modulus 'n.' The technique disclosed here avoids explicit use of a Montgomery form in Montgomery multiplication by incorporating modular reduction in side-channel-attack-resistant cryptographic computation, thereby reducing the number of functional calls. The implicit transformation of an input message into a Montgomery form in a public-key engine (PKE).

Advantages of the technique disclosed herein include efficiently using computational resources already available for message blinding to accomplish Montgomery multiplication without explicit conversion to Montgomery form. An additional advantage of the disclosed approach includes prevention of message value leakage inside any node of the public-key cryptography system as well as during communication between two nodes of the system.

FIG. 1 illustrates an example processing device 100 having a public key engine (PKE) and other components, in accordance with some aspects of the present disclosure. A PKE is a type of self-contained cryptographic module designed to be integrated into an integrated circuit configured to execute a cryptographic algorithm in a public-key cryptography system. In various embodiments, PKE can be implemented as an embedded hardware module, a purely software-based engine, or a combination of both hardware and software components. The processing device 100 may include internal memory (not shown) and various components/modules 110-160 used for cryptographic operations. Examples of such cryptographic operations include, but are not limited to, generating a digital signature to authenticate a message 'm'. Processing device 100 may be at a first node of a public key cryptography system.

As shown in FIG. 1, the processing device 100 may include, among other things, an input message receiving component 110, a random number generator component 120, an input message blinding component 130, a modular arithmetic unit 140, a public key engine 150 and a blinded message transmission component 160. In alternative embodiments, the functionality of one or more of the modules may be combined or divided. For example, the modular arithmetic unit 140 may be combined with one or both of input message blinding component 130 and public key engine 150. Functionalities of at least some of the components 130, 140 and 150 may be implemented by or in processing logic that may include hardware (e.g., processing device, circuitry, dedicated logic, programmable logic, microcode, integrated circuit, hardware of a device, etc.), software (e.g., instructions run or executed on a processing device), or a combination thereof.

The input message receiving component 110 may receive an input message 'm' which is meant to be transmitted to another node within the public-key cryptography system. Random numbers generated by the random number generator component 120 may be added to the input message 'm' to mask or 'blind' the input message against possible SCA attack. Blinding may involve performing XOR operations on shares of the input message 'm', and transmitting the shares. The blinding operations may be carried out in input message blinding component 130. The modular arithmetic unit 140 may compute a second random number 'h' based on the first random number 'r' and a factor 'R' used for Montgomery multiplication, wherein $h=r \, R^2$ mod n. The public key engine 150 performs a series of operations to ultimately produce the signature 'S' in the desired form: $S=(r^e m)^{d-1}(r^{e-1}m)$ mod n. The blinded message transmission component 160 transmits the signature 'S' containing the blinded message.

Figure 2:
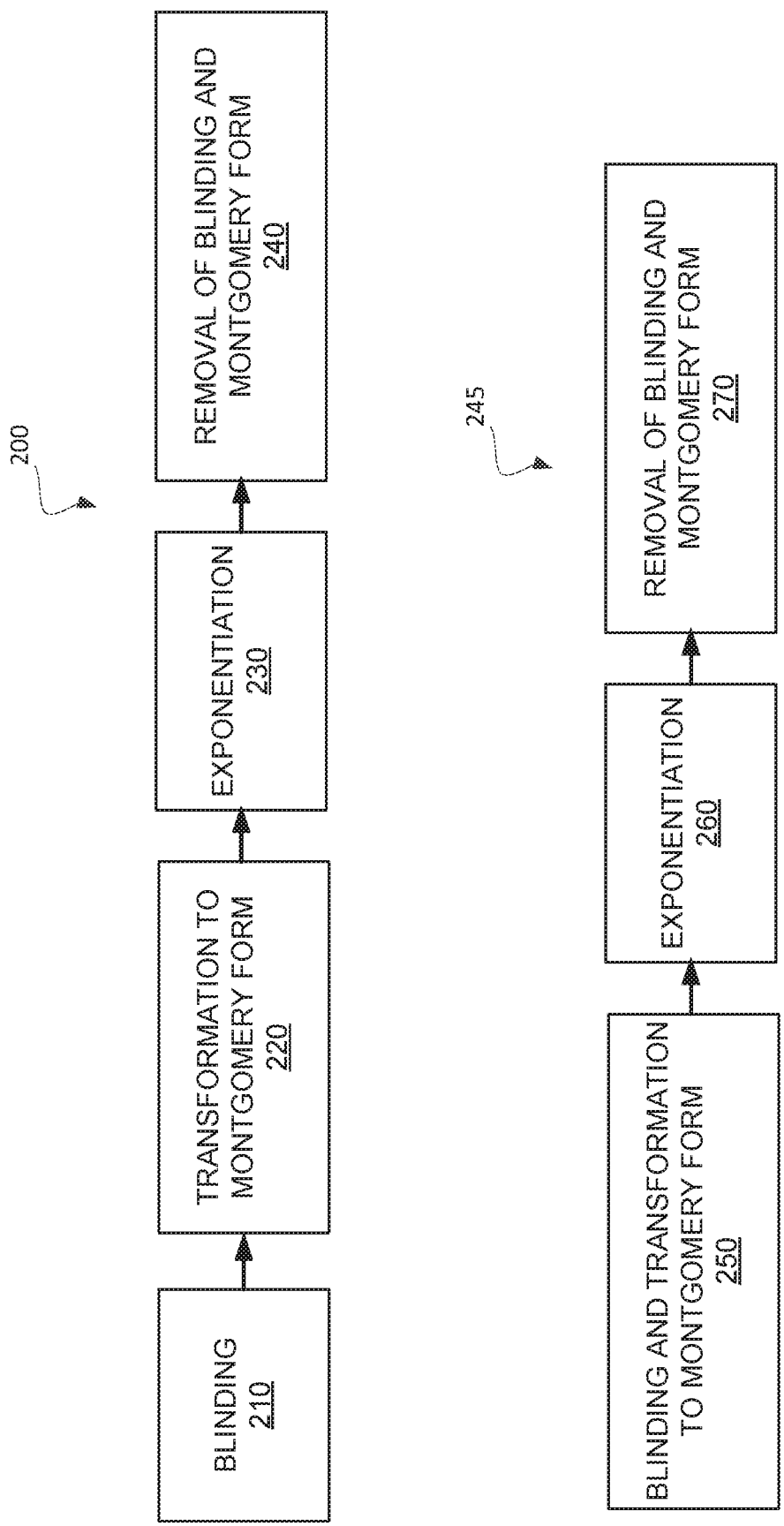
FIG. 2 illustrates a comparison between a conventional mechanism of generating a signature for a blinded input message in a public-key cryptography system and an improved mechanism of generating a signature for a blinded input message in a public-key cryptography system in accordance with aspects of the present disclosure.

FIG. 2 illustrates a comparison between a conventional mechanism of generating a signature for a blinded input message in a public-key cryptography system and an improved mechanism of generating a signature for a blinded input message in a public-key cryptography system in accordance with aspects of the present disclosure. The conventional mechanism illustrated in diagram 200 uses an explicit conversion (transformation) into Montgomery form, where the improved mechanism illustrated by diagram 245 uses an implicit conversion (transformation) into Montgomery form. In the conventional mechanism, input message blinding is carried out at a block 210, and transformation to Montgomery form is carried out in a separate and distinct block 220, that receives the output of the block 210. For example, an output of the block 210 may be the blinded message (m.r), which is an input to the block 220. Input message 'm' is transformed into Montgomery form in block 220. Post-transformation, exponentiation (with private exponent 'd') is carried out at block 230 to produce the signature. Once the signature is transmitted to a second node of the public-key cryptography system, a block 240 at a decoding device at the second node removes the blinding and the Montgomery form to decipher the underlying input message 'm'.

In contrast to the conventional mechanism, the presently disclosed mechanism combines the functionalities of the blocks 210 and 220 into a single block 250, as shown in diagram 245. Instead of explicitly using conversion of the input message 'm' into Montgomery form, block 250 can execute operations such as operations described in FIG. 4 to generate the signature 'S' in the desired form, i.e., $S=(r^e m)^{d-1}(r^{e-1}m)$ mod n, wherein 'e' is a public exponent, and is a private exponent. An SCA-resistant software library (SL), for example, DPASL (Differential Power Analysis-resistant Software Library), stored within block 250, may have codes containing the random value 'r' A series of Montgomery multiplications, e.g., as described in FIG. 4, take place in a PKE within block 250. The functional blocks 260 and 270 of diagram 245 are functionally equivalent to their counterpart functional blocks 230 and 240 in the conventional mechanism shown as diagram 200.

Figure 3:
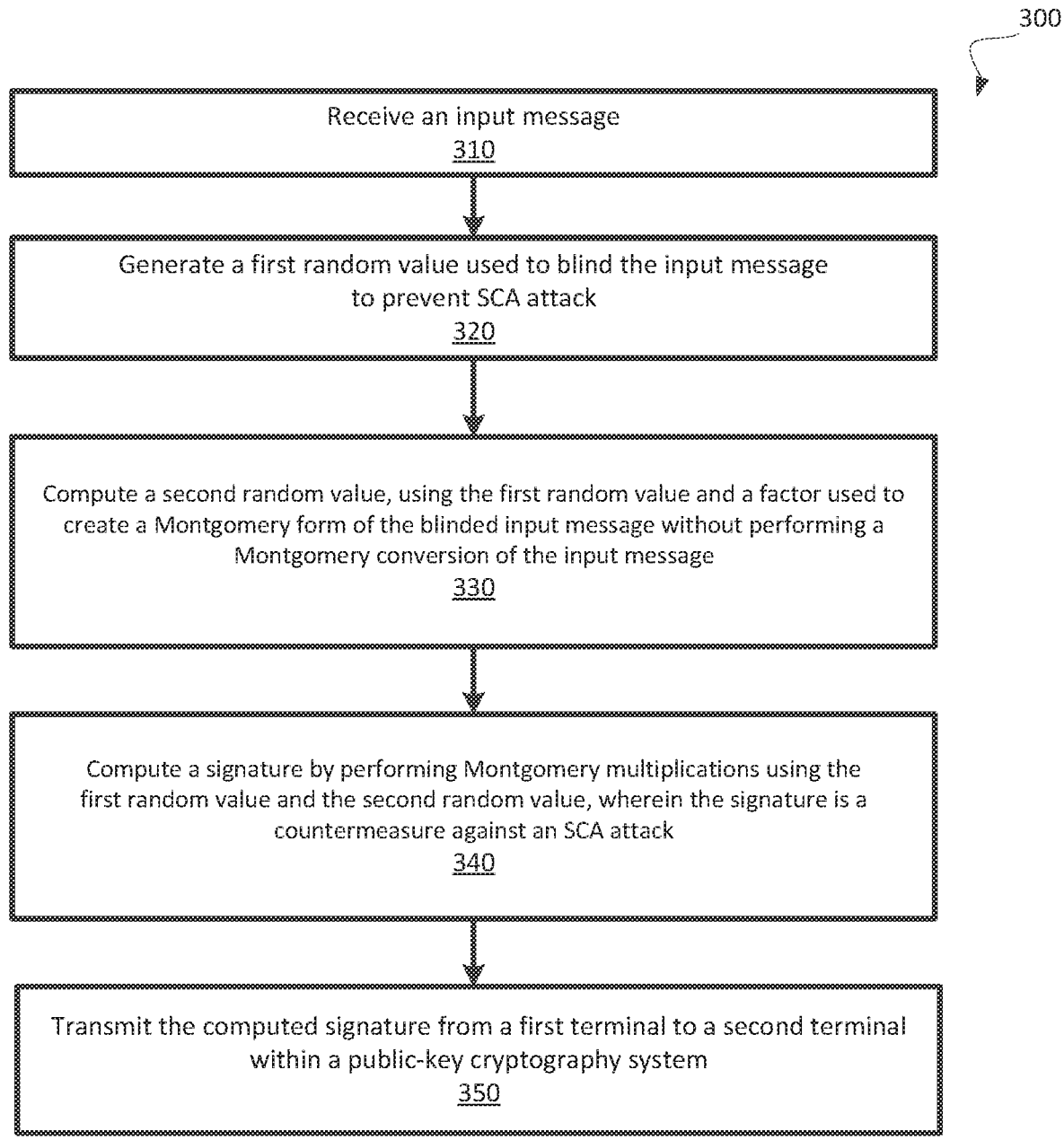
FIG. 3 is a flow diagram of a method for generating a signature for a blinded input message in a public-key cryptography system without explicitly converting the input message into Montgomery form, in accordance with some embodiments of the present disclosure.

FIG. 3 is a flow diagram of an example method 300 to perform a SCA-resistant message transfer between a first node and a second node within a public-key cryptography system. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the components of processing device 100 shown in FIG. 1.

Referring back to FIG. 3, method 300 begins at block 310, where an input message 'm' is received at the processing device, for example at the input message receiving component 110 shown in FIG. 1. The input message may be received in the form of a plurality of shares for further cryptographic operations.

At block 320, a first random value is generated. The purpose of the first random value 'r' is to blind the input message 'm' to prevent an SCA attack. The random value may be generated by the random number generator component 120. In an embodiment, the random value may be stored within an internal memory (not shown in FIG. 1) within the processing device 100. The message blinding may be performed by the input message blinding component 130 shown in FIG. 1.

At block 330, a second random value 'h' is computed. This can be performed by the modular arithmetic unit 140 in FIG. 1. The second random value can be computed using the first random value 'r' and a factor 'R' used to create a Montgomery form of the blinded input message without performing an explicit Montgomery conversion of the input message 'm.' FIG. 4 provides further details of this operation, in accordance with some embodiments.

At block 340, a signature 'S' is computed by performing a plurality of Montgomery multiplications using the first random value 'r' and the second random value 'h'. A plurality of intermediate values are generated in order to ultimately derive the signature value 'S,' as described below in further detail with reference to FIG. 4. These operations can take place within the public key engine 150. Note that during the sequence of operations performed within the public key engine 150, each of the intermediate values or any combination of intermediate values does not reveal the underlying secret message. Therefore, no direct-value leak is expected. Additionally, because the input message is blinded, and the blinding value (i.e., the first random number 'r') keeps changing, the possibility of information leakage during communication between a first node and a second node of the public-key system is also minimized or prevented altogether.

FIG. 4 shows the intermediate operations used to ultimately generate the signature 'S', in accordance with some implementations of the present disclosure. These operations mostly take place in blocks 330 and 340 of the flow diagram 300. As mentioned above, the second random value 'h' takes the form h=r R² mod n, where 'r' is a first random value used to blind the input message 'm'. Note that the factor R is expressed as R=2' mod n, where 'b' is a bit length, and 'x' is the number of words of bit length 'b' used to form 'n'. The next operation is computing a first intermediate value 'v' by multiplying 'h' with 1, where v=r R mod n. Next, a second intermediate value 'k' is computed using Montgomery multiplication, where k=$r^{e-1}$ R mod n, where 'e' is a public exponent. Next, a third intermediate value 'j' is computed using Montgomery multiplication, where j=$r^{e-1}$ m mod n. Next, a fourth intermediate value 'p' is computed using Montgomery multiplication, where p=$r^e$ m R mod n. Next, Montgomery multiplying the third intermediate value 'j' by the fourth intermediate value 'p' produces the signature 'S,' wherein S=$p^{d-1}$ j mod n, where is a private exponent. This form of S is equivalent to the desired form of signature 'S', i.e. S=$(r^e m)^{d-1}(r^{e-1}m)$ mod n.

Persons skilled in the art will understand that although the flow diagram in FIG. 3 shows a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
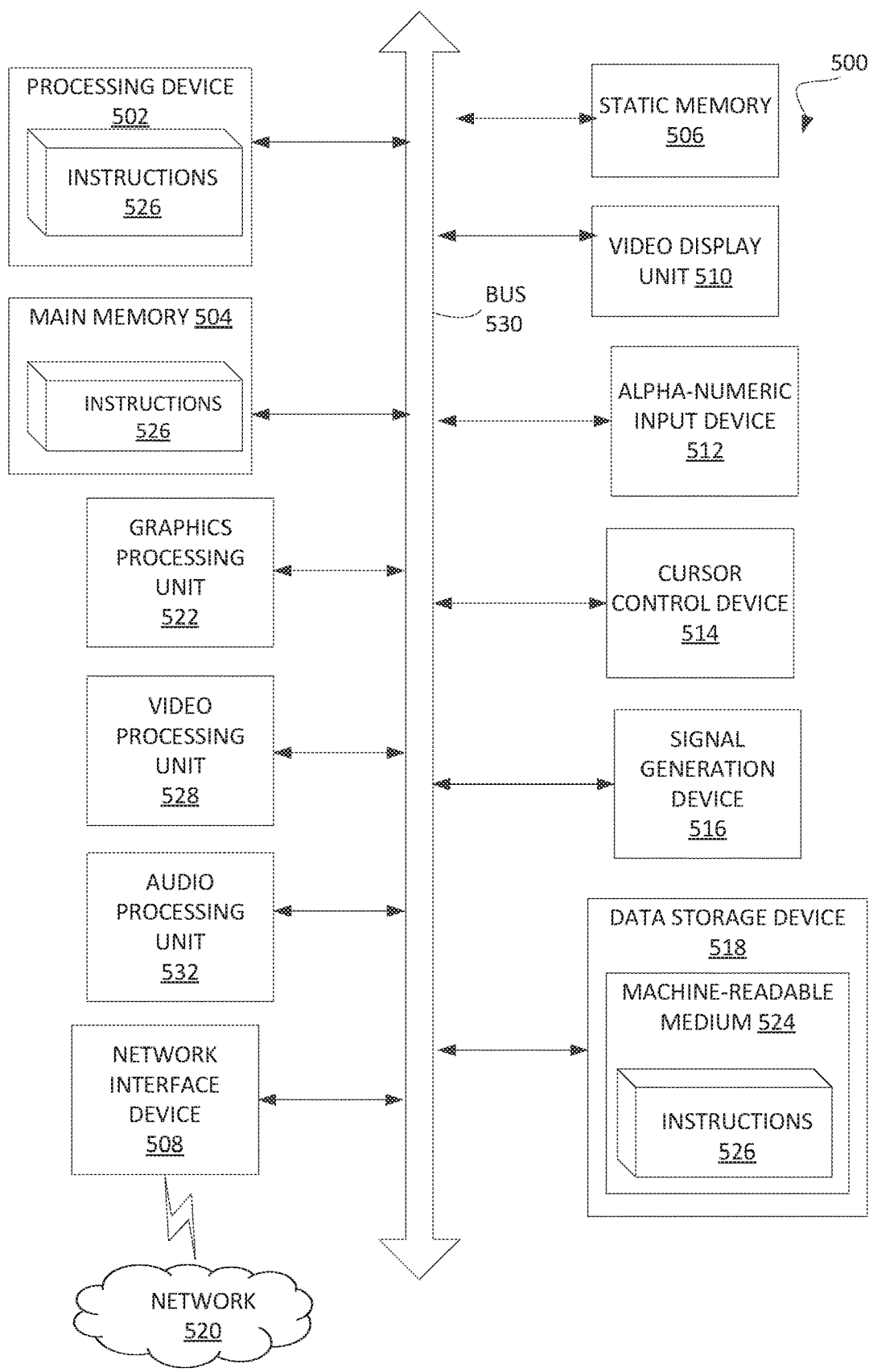
FIG. 5 illustrates a block diagram of a sample computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. In one implementation, processing device 502 may be the processing device 100 in FIG. 1.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionalities corresponding to operational blocks 250 and 260 shown in diagram 245. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "generating" or "executing" or "performing" or "computing" or "creating" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method comprising:
    receiving an input message at a processor executing a cryptographic algorithm;
    generating, by the processor, a first random value that is used to blind the input message to prevent a side-channel analysis (SCA) attack;
    computing, by the processor, a second random value, using the first random value and a factor used to create a Montgomery form of the blinded input message without performing a Montgomery conversion of the input message, wherein the processor causes the second random value to take the form $h = r R^2 \mod n$,
    where 'r' is the first random value that is used to blind the input message,
    'n' is a public modulus, and
    'R' is the factor used to create the Montgomery form, wherein
    $R = 2^{bx} \mod n$,
    where 'b' is a bit length, and 'x' is the number of words of bit length 'b' used to form 'n'; and
    computing, by the processor, a signature by performing Montgomery multiplications using the first random value and the second random value, wherein the signature is a countermeasure against the SCA attack.

2. The method of claim 1, wherein computing the signature comprises:
    computing a first intermediate value 'v' by multiplying 'h' with 1, where $v = r R \mod n$;
    computing a second intermediate value 'k' using Montgomery multiplication, where $k = r^{e-1} R \mod n$, where 'e' is a public exponent, and 'm' is the input message;
    computing a third intermediate value 'j' using Montgomery multiplication, where $j = r^{e-1} m \mod n$; and
    computing a fourth intermediate value 'p' using Montgomery multiplication, where $p = r^e m R \mod n$.

3. The method of claim 2, wherein computing the signature further comprises:
    Montgomery multiplying the third intermediate value 'j' by the fourth intermediate value 'p' to produce the signature 'S,' wherein $S = p^{d-1} j \mod n$, where 'd' is a private exponent.

4. The method of claim 3, wherein an equation representing the signature 'S' takes the form of:

$$S = (r^e m)^{d-1} (r^{e-1} m) \mod n.$$

5. The method of claim 1, wherein the first random value 'r' has a bit length equal to or less than the public modulus 'n.'

6. The method of claim 1, wherein the signature is compatible with public-key cryptography.

7. The method of claim 6, wherein the method further comprises:
    transmitting the signature from a first node to a second node within a public-key cryptography system, wherein the second node is capable of deciphering the blinded input message.

8. The method of claim 1, wherein the SCA attack comprises a Differential Power Analysis (DPA) attack.

9. The method of claim 8, wherein the method further comprises: providing a DPA-resistant software library that includes codes containing the first random value 'r.'

10. The method of claim 1, wherein the Montgomery multiplications are performed in a public key engine (PKE).

11. A public-key cryptography system comprising:
    an external memory; and
    a processor, executing a cryptography algorithm and being operatively coupled with the external memory, to:
    receive an input message;
    generate, a first random value that is used to blind the input message to prevent a side-channel analysis (SCA) attack;
    compute a second random value, using the first random value and a factor used to create a Montgomery form of the blinded input message without performing a Montgomery conversion of the input message, wherein the processor causes the second random value to take the form h=r R² mod n, where 'r' is the first random value that is used to blind the input message, 'n' is a public modulus, and 'R' is the factor used to create the Montgomery form, wherein R=$2^{bx}$ mod n, where 'b' is a bit length, and 'x' is the number of words of bit length 'b' used to form 'n'; and compute a signature by performing Montgomery multiplications using the first random value and the second random value, wherein the signature is a countermeasure against the SCA attack.

12. The system of claim 11, wherein the processor is further to:

compute a first intermediate value 'v' by multiplying 'h' with 1, where v=r R mod n;

compute a second intermediate value 'k' using Montgomery multiplication, where k=$r^{e-1}$ R mod n, where 'e' is a public exponent, and 'm' is the input message;

compute a third intermediate value 'j' using Montgomery multiplication, where j=$r^{e-1}$m mod n; and compute a fourth intermediate value 'p' using Montgomery multiplication, where p=$r^e$ m R mod n.

13. The system of claim 12, wherein the processor is further to:

Montgomery multiply the third intermediate value 'j' by the fourth intermediate value 'p' to produce the signature 'S,' wherein S=$p^{d-1}$ j mod n, where 'd' is a private exponent.

14. The system of claim 13, wherein an equation representing the signature 'S' takes the form of:

$$S=(r^e m)^{d-1}(r^{e-1}m) \bmod n.$$

15. The system of claim 11, wherein the first random value 'r' has a bit length equal to or less than the public modulus 'n.'

16. The system of claim 11, wherein the signature is compatible with public-key cryptography.

17. The system of claim 15, wherein the processor is further to:

transmit the signature from a first node to a second node within the public-key cryptography system, wherein the second node is capable of deciphering the blinded input message.

18. The system of claim 11, wherein the SCA attack comprises a Differential Power Analysis (DPA) attack.

* * * * *

UNITED STATES PATENT AND TRADEMARK OFFICE
CERTIFICATE OF CORRECTION

| | |
|---|---|
| PATENT NO. | : 11,522,669 B2 |
| APPLICATION NO. | : 17/042006 |
| DATED | : December 6, 2022 |
| INVENTOR(S) | : Michael Tunstall |

It is certified that error appears in the above-identified patent and that said Letters Patent is hereby corrected as shown below:

On the Title Page

Correct ABSTRACT to read "Aspects of the present disclosure involves receiving an input message, generating a first random value that is used to blind the input message to prevent a side-channel analysis (SCA) attack, computing a second random value using the first random value and a factor used to compute the Montgomery form of a blinded input message without performing an explicit Montgomery conversion of the input message, and computing a signature using Montgomery multiplication, of the first random value and the second random value, wherein the signature is resistant to the SCA attack."

Signed and Sealed this
Twenty-eighth Day of February, 2023

Katherine Kelly Vidal
*Director of the United States Patent and Trademark Office*